US010846786B2

(12) United States Patent
Iwai et al.

(10) Patent No.: US 10,846,786 B2
(45) Date of Patent: Nov. 24, 2020

(54) STORAGE BATTERY MODULE RENTAL SYSTEM, RENTAL METHOD, AND RENTAL PROGRAM (71) Applicant: TOYOTA JIDOSHA KABUSHIKI KAISHA, Toyota (JP)

(72) Inventors: Satoshi Iwai, Okazaki (JP); Koji Yamada, Toyota (JP); Marie Ishikawa, Nagoya (JP); Akinori Sato, Mishima (JP); Masanori Ishigaki, Nagakute (JP); Shuji Tomura, Nagakute (JP); Shigeaki Goto, Nagakute (JP); Makoto Kusakabe, Nagakute (JP); Tomoki Nishi, Nagakute (JP); Akira Shichi, Nagakute (JP); Hiroyuki Yamada, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 11 days.

(21) Appl. No.: 16/173,470

(22) Filed: Oct. 29, 2018

(65) Prior Publication Data
US 2019/0197608 A1  Jun. 27, 2019

(30) Foreign Application Priority Data

Dec. 27, 2017 (JP) ................................ 2017-251868

(51) Int. Cl.
*H02J 7/00* (2006.01)
*G06Q 30/06* (2012.01)
*G06Q 10/06* (2012.01)
*H02J 3/38* (2006.01)
*G01R 31/382* (2019.01)
(Continued)

(52) U.S. Cl.
CPC .......... *G06Q 30/0645* (2013.01); *B60L 53/80* (2019.02); *G01R 31/382* (2019.01); *G06Q 10/06* (2013.01); *H02J 3/383* (2013.01); *H02J 3/386* (2013.01); *H02J 7/0021* (2013.01); *G06Q 20/08* (2013.01); *H02J 3/381* (2013.01); *H02J 7/00* (2013.01); *H04W 4/02* (2013.01)

(58) Field of Classification Search
USPC .................................................. 320/104–115
See application file for complete search history.

(56) References Cited

U.S. PATENT DOCUMENTS

| 2012/0303553 | A1 | 11/2012 | LaFrance | |
| 2016/0087314 | A1* | 3/2016 | Arashima | H01M 10/425 320/134 |
| 2016/0099590 | A1* | 4/2016 | Velderman | H02J 7/0045 320/113 |

FOREIGN PATENT DOCUMENTS

JP  2012-248191 A  12/2012

* cited by examiner

*Primary Examiner* — Binh C Tat
(74) *Attorney, Agent, or Firm* — Oliff PLC (57) ABSTRACT

A storage battery module rental system includes a storage battery module prepared in each providing point that is dispersedly distributed and that can be rented to a user, an acquisition unit configured to acquire individual information of a plurality of the users and module information from the storage battery module, the user being a rentee candidate of the storage battery module, a determining unit configured to determine an incentive given for renting the storage battery module based on the individual information and the module information in such a way that the incentive could differ for each user; and a notifying unit configured to notify the user of the incentive determined by the determining unit for each of the users.

12 Claims, 8 Drawing Sheets

(51) Int. Cl.
B60L 53/80 (2019.01)
*G06Q 20/08* (2012.01)
*H04W 4/02* (2018.01)

INDIVIDUAL INFORMATION (A)

| (P0) REGISTRATION ID | 123abc | |
|---|---|---|
| (P1) RENTAL INFORMATION | | |
| DESIRED RENTAL TIME | WITHIN 30 MINUTES | |
| SCHEDULED RETURN TIME | UNDECIDED | |
| (P2) VEHICLE INFORMATION | | |
| CURRENT LOCATION | NORTH LATITUDE xxa<br>EAST LONGITUDE yya | |
| TRAVELABLE DISTANCE | 15 km | |
| CONSUMPTION HISTORY INFORMATION | | |
| | MAXIMUM OUTPUT | 130 kW |
| | AVERAGE OUTPUT | 60 kW |
| | AVERAGE REPLACEMENT PERIOD | 25 DAYS |

INDIVIDUAL INFORMATION (B)

| (P0) REGISTRATION ID | 456def | |
|---|---|---|
| (P1) RENTAL INFORMATION | | |
| DESIRED RENTAL TIME | WITHIN 180 MINUTES | |
| SCHEDULED RETURN TIME | UNDECIDED | |
| (P2) VEHICLE INFORMATION | | |
| CURRENT LOCATION | NORTH LATITUDE xxb<br>EAST LONGITUDE yyb | |
| TRAVELABLE DISTANCE | 30 km | |
| CONSUMPTION HISTORY INFORMATION | | |
| | MAXIMUM OUTPUT | 90 kW |
| | AVERAGE OUTPUT | 40 kW |
| | AVERAGE REPLACEMENT PERIOD | 26 DAYS |

Fig. 6

MODULE INFORMATION (A)

| (M0) MODULE ID | XY07883 |
|---|---|
| (M1) CHARGING FACILITY INFORMATION | |
| PROVIDING POINT | NORTH LATITUDE xaa<br>EAST LONGITUDE yaa |
| CHARGING COST | 30.3 YEN/kWh |
| QUICK CHARGE | OK |
| (M2) BATTERY PERFORMANCE | |
| DEGRADATION LEVEL | A |
| CAPACITY AT FULL CHARGE | 60 kWh |
| TYPE | LITHIUM ION |
| (M3) CHARGED STATE | FULL |

MODULE INFORMATION (B)

| (M0) MODULE ID | XZ00291 |
|---|---|
| (M1) CHARGING FACILITY INFORMATION | |
| PROVIDING POINT | NORTH LATITUDE xbb<br>EAST LONGITUDE ybb |
| CHARGING COST | 42.3 YEN/kWh |
| QUICK CHARGE | OK |
| (M2) BATTERY PERFORMANCE | |
| DEGRADATION LEVEL | C |
| CAPACITY AT FULL CHARGE | 80 kWh |
| TYPE | LITHIUM ION |
| (M3) CHARGED STATE | 80% |

Fig. 7

POWER GENERATION INFORMATION (A)

| (G0) FACILITY INFORMATION | |
|---|---|
| FACILITY ID | 023S |
| TYPE | PHOTOVOLTAIC POWER GENERATION |
| (G1) POWER INFORMATION | |
| CURRENT POWER GENERATION AMOUNT | 0.13 kWh/HOUR |
| STORAGE BATTERY CHARGE AMOUNT | 457kWh |

POWER GENERATION INFORMATION (B)

| (G0) FACILITY INFORMATION | |
|---|---|
| FACILITY ID | 015S |
| TYPE | WIND POWER GENERATION |
| (G1) POWER INFORMATION | |
| CURRENT POWER GENERATION AMOUNT | 0.35 kWh/HOUR |
| STORAGE BATTERY CHARGE AMOUNT | 213kWh |

STORAGE BATTERY MODULE RENTAL SYSTEM, RENTAL METHOD, AND RENTAL PROGRAM

CROSS REFERENCE TO RELATED APPLICATIONS

This application is based upon and claims the benefit of priority from Japanese patent application No. 2017-251868, filed on Dec. 27, 2017, the disclosure of which is incorporated herein in its entirety by reference.

BACKGROUND

The present disclosure relates to a storage battery module rental system, a rental method, and a rental program.

There is a known technique of varying an electricity price according to times of day at which the electricity is supplied (e.g., see Japanese Unexamined Patent Application Publication No. 2012-248191).

SUMMARY

Recent storage battery modules have been remarkably improved in performance, and they are becoming available in electric vehicles in which they are mounted in a replaceable manner. Replaceable storage battery modules are expected not only for being mounted on electric vehicles but also for application to various devices. However, the replaceable storage battery modules may be unsuitable, in some aspects, for private ownership, because of the reasons such that they cannot be used while they are being charged. To address this issue, a rental system in which a business operator owns storage battery modules and rents the charged storage battery modules to the users is now under consideration. However, with the rental system, it is necessary to somewhat disperse the providing points in order to improve convenience and to prepare a large number of storage battery modules in each providing point. There are also various circumstances on the user side who rents the storage battery module. Some users need to urgently replace the storage battery module, while others want to rent the storage battery module at as low cost as possible.

The present disclosure has been made to solve such a problem. An object of the present disclosure is to provide a storage battery module rental system and the like that optimally allocate storage battery modules according to circumstances of a renter side and a rentee side.

A first exemplary aspect of the present disclosure is a storage battery module rental system including: a storage battery module prepared in each providing point that is dispersedly distributed and that can be rented to a user; an acquisition unit configured to acquire individual information of a plurality of the users and module information from the storage battery module, the user being a rentee candidate of the storage battery module; a determining unit configured to determine an incentive given for renting the storage battery module based on the individual information and the module information in such a way that the incentive could differ for each user; and a notifying unit configured to notify the user of the incentive determined by the determining unit for each of the users.

By presenting the incentive that could differ for each user in consideration of circumstances and state of the user who rents, it is possible to promote the user to select, for example, the storage battery module at a remote place or a storage battery module charged with renewable energy. That is, even when the number of storage battery modules prepared in each of the dispersedly distributed providing points or even when a certain power generation facility can generate a large amount of electric power at low cost, it is possible to adjust the balance between supply and demand and efficiently utilize the storage battery module throughout the area.

In the above storage battery module rental system, when the determining unit determines the incentive given for renting one of the storage battery modules to the plurality of users, the determining unit compares the individual information of the users with each other to determine the incentive. When the circumstances and state of the users are compared to decide the incentive in this manner, if rental requests competes for one storage battery module, it is possible to smoothly guide some users to select the storage battery modules other than the one competed for.

The above storage battery module rental system further includes a power generation facility that is established so as to correspond to the providing point and that generates electric power as renewable energy for charging the storage battery module. The acquisition unit may acquire power generation information related to an amount of power generated by the power generation facility. The determining unit may determine the incentive given for renting the storage battery module based on the individual information, the module information, and the power generation information in such a way that the incentive could differ for each of the users. Although the amount of electric power supplied by renewable energy tends to be unstable depending on the natural environment, the power generation facility that generates renewable energy will spread fast, when the storage battery module in a specific providing point is guided to be rented or guided not to be rented according to the power generation information.

The above storage battery module rental system further includes a charging facility that is established at the providing point and that can adjust a charging speed to charge the storage battery module at the providing point, the individual information may include information related to a rental time of the storage battery module that the user desires to rent, and the determining unit may determine the incentive in consideration of whether the charging facility needs to adjust the charging speed according to the rental time. Degradation of some storage battery module advances due to quick charging. However, when the storage battery module needs to be quickly charged, the incentive can be reduced so that possibility of being selected by the user is reduced. When the storage battery module is not selected, it is not necessary to quickly charge it, and thus the storage battery module lasts longer.

In the above storage battery module rental system, the individual information may include at least one of a return time and a return point at which the user desires to return the rented storage battery module, and the determining unit may determine the incentive in consideration of the return time and the return point. The return information is useful for planning a more optimal allocation of the storage battery modules, considering the charge cycle, and the increase and decrease of demand. Thus, the incentive may be increased to promote the user to provide the return information.

In the above storage battery module rental system, the module information may include cost information about a cost for charging the storage battery module, and the determining unit may determine the incentive in consideration of the cost information. By deciding in this manner, it is possible to provide many storage battery modules that can be charged at a lower price. Further, the module information may include degradation information representing a level of degradation of the storage battery module, and the determining unit may determine the incentive in consideration of the degradation information. By determining in this way, it is possible to promote usage of a slightly deteriorated storage battery module.

In the above storage battery module rental system, the storage battery module may be detachably mounted on an electric vehicle as an energy source for traveling of the electric vehicle, the individual information may include vehicle information of the electric vehicle, and the determining unit may determine the incentive in consideration of the vehicle information. A storage battery module detachably mounted on the electric vehicle is relatively large, takes time to charge, and has a large financial burden for private ownership. Thus, such a rental system is expected to effectively function.

In this case, the vehicle information may include vehicle location information of the electric vehicle, the module information may include providing point information of the providing point at which the storage battery module is prepared, and the determining unit may determine the incentive in consideration of a distance between the electric vehicle and the providing point calculated from the vehicle location information and the providing point information. In this case, the determining unit may determine the incentive in consideration of the distance between the electric vehicle and the providing point and the distance that can be traveled by the electric vehicle. By determining the incentive in this manner, it is possible to allocate the storage battery modules more optimally.

Further, the vehicle information may include history information related to consumption of the storage battery module mounted on the electric vehicle in the past, and the determining unit may determine the incentive in consideration of the history information. Providing the incentive to the user who travels with reduced output of the storage battery module effectively prevents the storage battery module from degrading. This enables the business operator to operate the storage battery module for a longer period of time.

A second exemplary aspect of the present disclosure is a storage battery module rental method including: acquiring module information from a storage battery module prepared in each providing point that is dispersedly distributed and that can be rented to a user; acquiring individual information of a plurality of the users, the user being a rentee candidate of the storage battery module; determining an incentive given for renting the storage battery module based on the individual information and the module information in such a way that the incentive could differ for each user; and notifying the user of the incentive determined by the determining unit for each of the users.

A third exemplary aspect of the present disclosure is a storage battery module rental method including: acquiring module information from a storage battery module prepared in each providing point that is dispersedly distributed and that can be rented to a user; acquiring individual information of a plurality of the users, the user being a rentee candidate of the storage battery module; determining an incentive given for renting the storage battery module based on the individual information and the module information in such a way that the incentive could differ for each user; and notifying the user of the incentive determined by the determining unit for each of the users.

Like the first exemplary aspect, in the second and third exemplary aspects, by presenting the incentive that could differ for each user in consideration of circumstances and state of the user who rents, it is possible to promote the user to select, for example, the storage battery module at a remote place or a storage battery module charged with renewable energy. That is, even when the number of storage battery modules prepared in each of the dispersedly distributed providing points or even when a certain power generation facility can generate a large amount of electric power at low cost, it is possible to adjust the balance between supply and demand and efficiently utilize the storage battery module throughout the area.

The present disclosure can provide a storage battery module rental system and the like that optimally allocates storage battery modules according to circumstances of a renter side and a rentee side.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
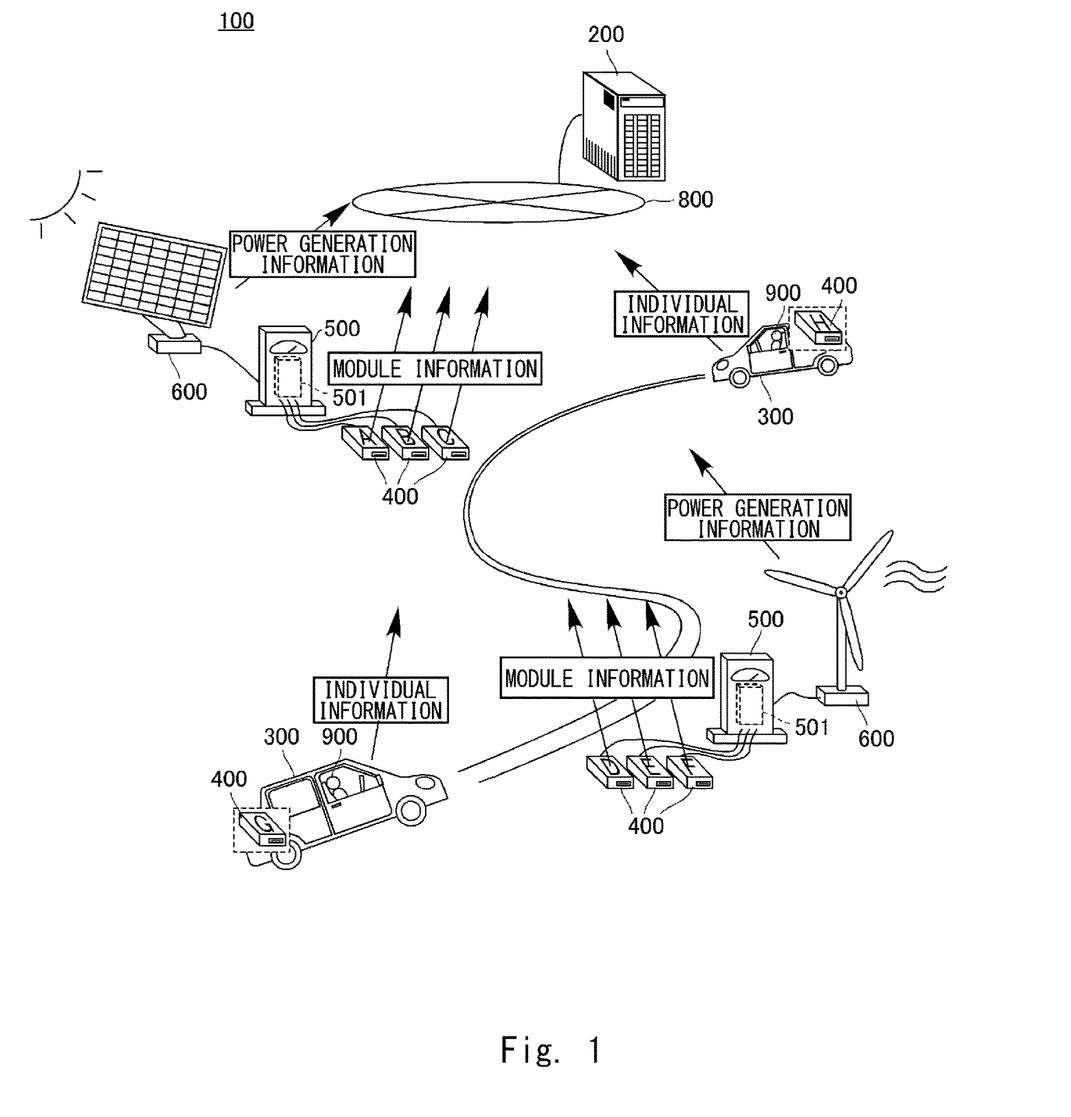
FIG. 1 is a conceptual diagram showing a rental system of storage battery modules according to an embodiment.

FIG. 1 is a conceptual diagram showing a rental system 100 for storage battery modules 400 according to this embodiment. The rental system 100 according to this embodiment rents the storage battery modules 400 detachable from vehicles 300, which are electric vehicles, at charging stations 500. The charging stations 500 are providing points dispersedly distributed across a target area covered by the rental system 100. The rental system 100 includes the vehicles 300 on which users 900 as rentee candidate ride, and storage battery modules 400, which are to be rented. The rental system 100 also includes the charging stations 500 that charge the storage battery modules 400 and power generation facilities 600 that supply electric power to the charging stations 500. Further, the rental system 100 includes a server 200 that is connected to the vehicles 300, the storage battery modules 400, and the power generation facilities 600 via an Internet network 800. The server 200 comprehensively controls the rental system 100.

The server 200 acquires individual information related to the vehicle from each of the vehicles 300 of the users 900 who are the rentee candidates of the storage battery module 400. In FIG. 1, two vehicles 300 are shown, but there may be one vehicle 300, or there may be three or more vehicles 300. Details of the individual information will be described later.

The server 200 acquires module information from each of the storage battery modules 400. The target storage battery modules 400 are the storage battery modules 400 to be rented at the charging stations 500 established in the target area where the storage battery modules 400 are to be optimally allocated. The module information is information related to a state and performance of the storage battery module 400. Details of the module information will be described later. In this embodiment, the storage battery module 400 transmits the module information to the server 200. When the storage battery module 400 is connected to the charging station 500, the charging station 500 may temporarily receive the module information, and then the charging station 500 may transmit the module information to the server 200. The storage battery module 400 may not include a communication IF to connect to the Internet network 800, when timings at which the module information is transmitted to the server 200 are limited within a period in which the storage battery module 400 is connected to the charging station 500.

The server 200 acquires power generation information related to an amount of power generated by the power generation facility 600 from the power generation facility 600. The power generation facility 600 according to this embodiment is a facility for generating electric power as renewable energy such as photovoltaic power generation, wind power generation, or the like. The electric power generated by each power generation facility 600 is supplied to the storage battery modules 400 via the charging stations 500. The charging station 500 incorporates a storage battery 501 having a capacity enough to charge a plurality of the storage battery modules 400. The storage battery 501 functions as a buffer for temporarily storing the electric power generated by the power generation facility 600.

FIG. 1 shows a state in which the power generation facilities 600 and the charging stations 500 are established in pairs. However, one power generation facility 600 may supply generated electric power to the plurality of charging stations 500. There may also be the charging station 500 that receives the electric power from a conventional power generation facility such as a thermal power generation facility, or there may be the charging station 500 that receives electric power from both a facility for generating electric power as renewable energy and a conventional power generation facility. In addition, the power generation facility 600 may include the storage battery 501. In this embodiment, the power generation facility 600 transmits the power generation information to the server 200. Alternatively, the charging station 500 that receives the electric power from the power generation facility 600 may temporarily receive the power generation information, and the charging station 500 may transmit the power generation information to the server 200.

The server 200 determines, for each rental request from the vehicle 300, an incentive given for renting the storage battery module 400 using the acquired individual information, the module information, and the power generation information, and then presents the incentive to the user 900. When the server 200 determines that it is preferable to rent a specific storage battery module 400, which is to be determined, to a certain user 900, it increases the incentive given for renting this storage battery module 400 to promote the user 900 to select the storage battery module 400. On the contrary, when the server 200 determines that it is not preferable to rent a specific storage battery module 400 to a certain user 900, it reduces the incentive given for renting this storage battery module 400 or does not give an incentive given for renting this storage battery module 400, so that the user 900 will not select this storage battery module 400. In this way, the server 200 differentiates the incentive for each user 900 and for each storage battery module 400, thereby optimally distributing the plurality of storage battery modules 400 owned by a business operator.

Figure 2:
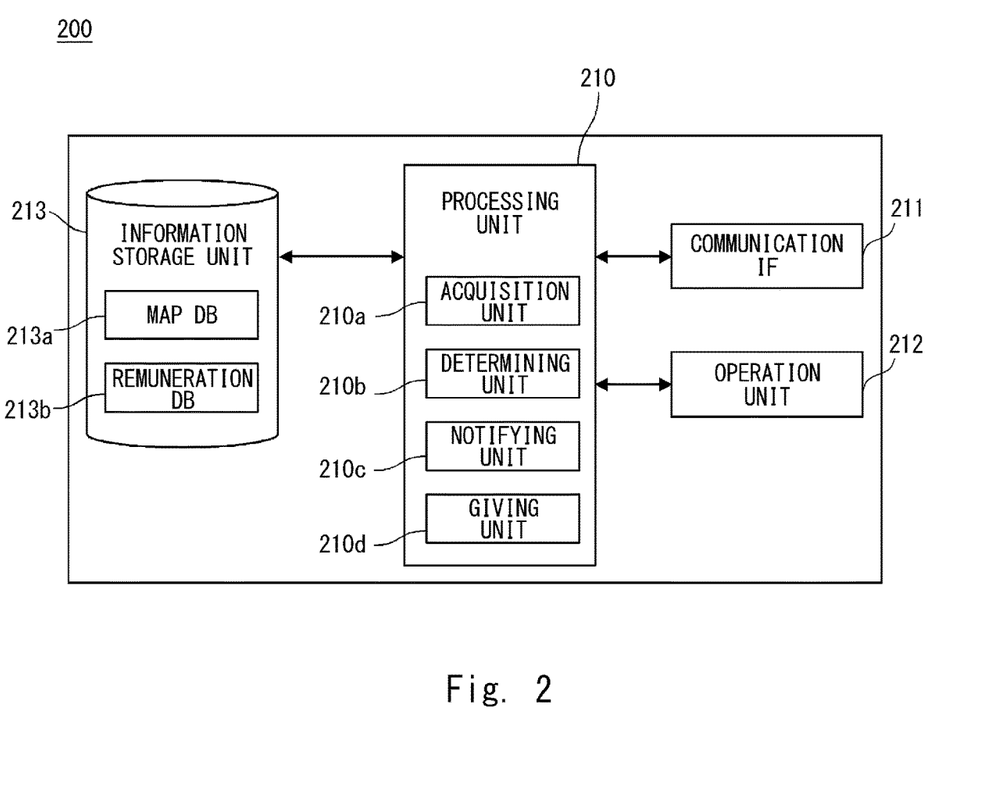
FIG. 2 is a view showing a configuration of a server.

FIG. 2 is a view showing a configuration of the server 200. A processing unit 210 is, for example, an MPU. The processing unit 210 executes control of the server 200 by executing a control program read from a system memory.

A communication IF 211 includes, for example, a wired LAN interface. The communication IF 211 is a communication interface for communicating with the Internet network 800. The processing unit 210 receives the individual information, the module information, and the power generation information via the communication IF 211, and transmits incentive information to be presented to the user 900. An operation unit 212 is an input device such as a keyboard and a mouse connected to the server main body. A system administrator operates the operation unit 212, for example, when he/she starts or terminates the system, adjusts a parameter value, or modifies a program.

An information storage unit 213 is, for example, an HDD. The information storage unit 213 stores various parameters, data, and a database (DB) that systematically accumulates the parameters and data. The information storage unit 213 stores, for example, a map DB 213*a*. The map DB 213*a* is map information of the target area covered by the rental system 100. The map DB 213*a* may also include associated information such as location information indicating locations of the charging stations 500 and the locations of the power generation facilities 600. The information storage unit 213 further stores a remuneration DB 213*b*. The remuneration DB 213*b* stores remuneration information related to incentives. The remuneration information may store the total amount of incentives that can be given in the target area and information of an opponent who is provided with the incentive.

Note that the information storage unit 213 may not be configured integrally with the server 200. Instead, the information storage unit 213 and the server 200 may be configured in such a way that they are connected to each other via the Internet network 800. It is not necessary for all the DBs to be stored in one information storage unit 213. The information storage unit 213 may be composed of a plurality of storages and the DB may be stored in each of the storages. Moreover, it is not necessary for all the DBs to be configured as a part of the rental system 100, and instead the server 200 may use the DB belonging to another system.

The processing unit 210 also functions as a function execution unit which executes various calculations and controls related to processing. An acquisition unit 210*a* acquires the individual information from the environment sensor 401 via the communication IF 211 in accordance with a transmission request from the vehicle 300. Further, the acquisition unit 210*a* acquires the module information from the storage battery module 400 via the communication IF 211 and the power generation information from the power generation facility 600 at a timing designated by the control program.

A determining unit 210*b* analyzes the individual information, the module information, and the power generation information acquired by the acquisition unit 210*a* and determines the incentive to present to the user 900. The determined incentive is passed over to a notifying unit 210c. The notifying unit 210c notifies the determined incentive for each user to each vehicle 300 via the communication IF 211, together with the information about the corresponding storage battery module 400.

When the user 900 completes a reservation of the storage battery module 400 or when the storage battery module 400 is actually rented, the giving unit 210d gives the incentive promised for the storage battery module 400 to the vehicle 300 via the communication IF 211. The incentive may be anything as long as it is defined by a format manageable as data. The incentive may be, for example, a numerical point that can be exchanged for goods or services when certain points are accumulated, or a digital ticket that can be exchanged for specific goods or services. Note that the incentive is not necessarily given to the vehicle 300 and instead may be given to a data storage previously designated by the user 900 or a management server of an incentive provider.

Figure 3:
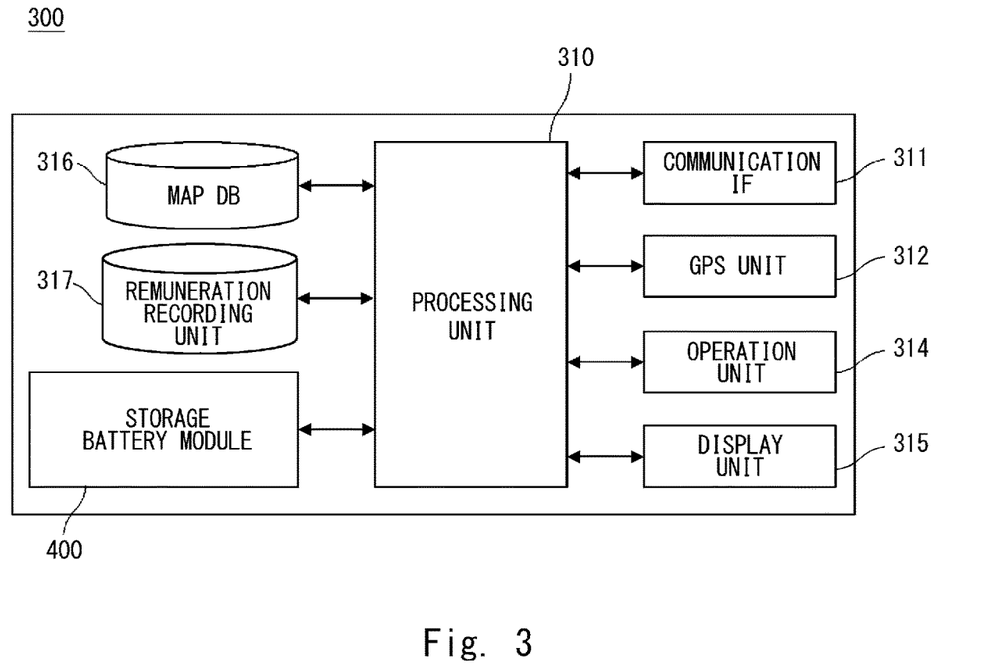
FIG. 3 is a view showing a configuration of a vehicle that uses a rental system.

FIG. 3 is a view showing a configuration of the vehicle 300. The processing unit 210 is, for example, an ECU. The processing unit 210 executes the control program read from the system memory to thereby control the vehicle 300. A communication IF 311 includes, for example, an interface connected to a 4G line and is an on-vehicle communication unit that is communicably connected to the Internet network 800. A GPS unit 312 receives a signal from a GPS satellite and outputs a latitude/longitude at which the vehicle 300 is located. A processing unit 310 acquires an output of the GPS unit 312 and recognizes the current location of the vehicle 300.

An operation unit 314 includes an operation member operated by the user 900. The operation unit 314 detects the operation and outputs it to the processing unit 310. A display unit 315 is, for example, a liquid crystal display. The display unit 315 displays the rentable storage battery modules 400 and their incentives, which are received from the server 200 in such a manner that they can be recognized by the user 900 or displays a map on which the current location of the vehicle 300 is superimposed.

The map DB 316 is, for example, an HDD. The map DB 316 stores a nationwide map including roads on which automobiles can travel. When the processing unit 310 displays the map or the location of the charging station 500 on the display unit 315, it reads the map of the target area from the map DB 316.

The remuneration recording unit 317 is, for example, an HDD. The remuneration recording unit 317 cumulatively records the incentives given from the server 200. For example, when the user 900 exchanges the accumulated points with goods or services, the remuneration recording unit 317 records the remaining points together with a history of the exchange.

Note that each of the map DB 316 and the remuneration recording unit 317 may be composed of a single storage. Alternatively, at least one of the map DB 316 and the remuneration recording unit 317 may not be mounted on the vehicle 300 and instead may be configured as a cloud storage via the Internet network 800. In such a case, the processing unit 310 performs reading and rewriting via the communication IF 311.

The storage battery module 400 is mounted on the vehicle 300 in a replaceable manner, and supplies the electric power to a motor or the like that outputs a driving force for driving the vehicle 300 when it is mounted on the vehicle 300. The processing unit 310 controls electric power supply of the storage battery module 400 and reads the module information recorded in the storage battery module 400 as necessary.

Figure 4:
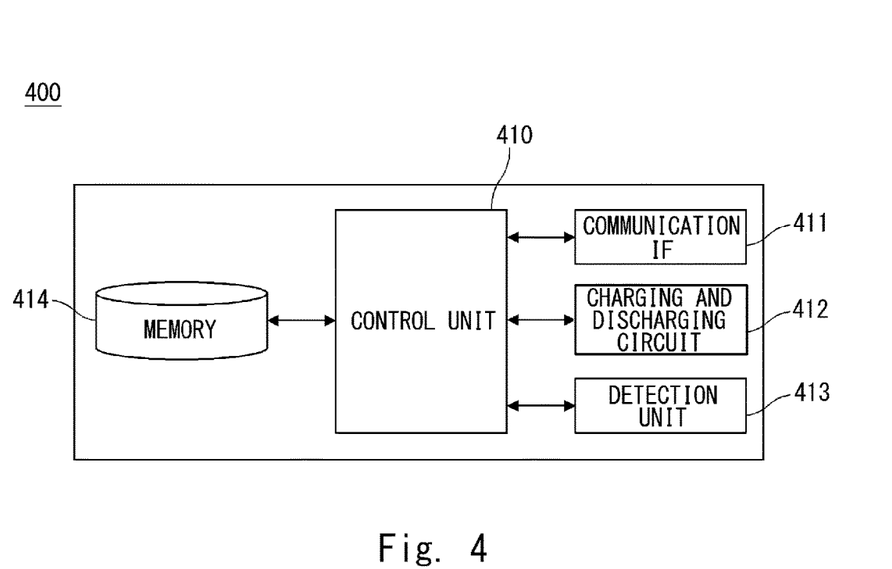
FIG. 4 is a view showing a configuration of a storage battery module.

FIG. 4 is a view showing a configuration of the storage battery module 400. A control unit 410 is, for example, a CPU. The control unit 410 executes the control program read from the system memory to thereby control the storage battery module 400. A communication IF 411 includes, for example, an interface connected to a 4G line and is an on-vehicle communication unit that is communicably connected to the Internet network 800. Further, the communication IF 411 includes an inter-device communication interface for communicably connecting to the charging station 500 when the storage battery module 400 is connected to the charging station 500 and for communicably connecting to the vehicle 300 when the storage battery module 400 is connected to the vehicle 300.

The charging and discharging circuit 412 functions as a circuit for charging the storage battery when the storage battery module 400 is connected to the charging station 500. The charging and discharging circuit 412 functions as a circuit for discharging the storage battery when the storage battery module 400 is connected to the vehicle. The control unit 410 controls the charging and discharging circuit 412 to charge and discharge the storage battery. A detection circuit 413 detects a remaining capacity of the storage battery and detects an amount of electric power output per unit time. The control unit 410 acquires a result of the detection of the detection circuit 413 and uses it to generate the module information or the like.

A memory 414 is, for example, an SSD (Solid State Drive). The memory 414 records the module information and the like related to the storage battery module 400. The control unit 410 writes the generated and updated module information in the memory 414, and reads the module information from the memory 414 when it transmits the module information to the server 200 or updates the module information.

Figure 5:
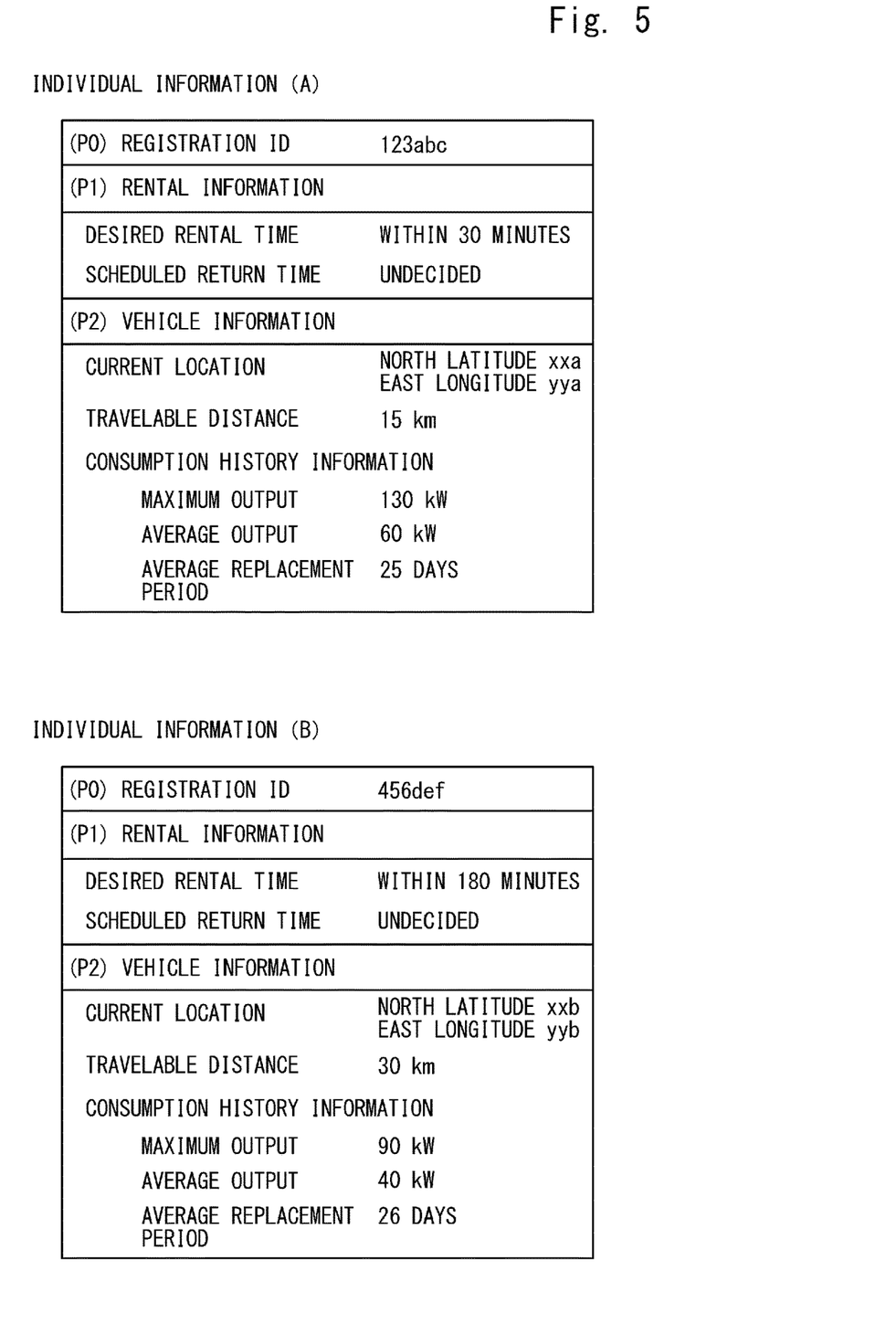
FIG. 5 is an example of individual information acquired from a vehicle by the server.

Next, a processing procedure from when the server 200 determines the incentive for each user who desires to rent the storage battery module 400 until when the server 200 notifies the incentive to the user will be described in detail. FIG. 5 shows individual information (A) acquired from a first vehicle and individual information (B) acquired from a second vehicle as examples of the individual information acquired by the acquisition unit 210a of the server 200. When a user driving the first vehicle thinks of replacing the storage battery module currently mounted at a certain point of time and operates the operation unit 314 to input decided information, the processing unit 310 of the first vehicle generates the individual information (A). Likewise, when a user driving the second vehicle thinks of replacing the storage battery module currently mounted at a certain point of time and operates the operation unit 314 to input decided information, the processing unit 310 of the second vehicle generates the individual information (B). The acquisition unit 210a acquires the generated individual information (A) and (B) via the Internet network 800.

Each of the individual information (A) and (B) includes a (P0) registration ID, (P1) renting information, and (P2) vehicle information. (P0) The registration ID is an ID number of the user and is information for identifying a rentee. The registration ID is issued, for example, at the time the user applies for the service to be provided.

(P1) The renting information is input when the user desires to rent. A desired rental time and a scheduled return time are described in the renting information. For example, options such as "within 30 minutes", "within 60 minutes", "within 90 minutes", "within 180 minutes", "not specified", etc. are prepared as the desired rental time. The user can select one of these options according to his/her circumstances. The scheduled return time is specified as, for example, a specific date including the month and the day. When the user is using the vehicle, for example, to commute, the user can know the replacement cycle of the storage battery module. Thus, in such a case, the user can designate the scheduled return time in order to obtain a larger incentive. The scheduled return time is described as undecided, unless otherwise specified.

(P2) The vehicle information is information related to the vehicle at the present time. The current location of the vehicle, a travelable distance, and consumption history information are described in the vehicle information. The current location is the current latitude and longitude identified from the output of the GPS unit 312. The travelable distance is an expected travelable distance calculated from the remaining capacity of electric power acquired from the currently mounted storage battery module and a traveling distance per unit electric energy of the vehicle.

The consumption history information is information about how to use the storage battery module mounted in a certain period of time in the past. The consumption history information includes a maximum output, an average output, and an average replacement period. The maximum output is a maximum value of output electric power requested for the vehicle to travel. When the user accelerates suddenly or travels at a high speed, the maximum output becomes a large value. The average output is an average value of the output electric power required for the vehicle to travel throughout the certain period of time. When the frequency of acceleration is high, the average output becomes a large value. The average replacement period is a replacement cycle of the storage battery module. A value of the average replacement period varies depending on, for example, the frequency at which the user uses the vehicle.

When the individual information (A) is compared with the individual information (B), firstly the desired rental time of (A) is within 30 minutes, while that of (B) is within 180 minutes. That is, the user of (A) wants the storage battery module to be provided more quickly than the user of (B). In this case, the number of storage battery modules that can be provided to (A) is limited, and thus the determining unit 210b may increase the incentive given to the user (B) than the incentive given to the user of (A).

The scheduled return times of (A) and (B) are undecided. This will not be a factor to generate a difference in the incentives of (A) and (B), accordingly. However, when the scheduled return time is designated, the rental system 100 can easily plan the charging work and the like. Thus, the determining unit 210b may increase the incentive for the user who designates the scheduled return time. In the example shown in the drawing, the charging station where the storage battery module is returned is not an item stored as the individual information. However, the user may be able to designate the charging station to which he/she returns the storage battery module. When the user designates the charging station to which he/she returns the storage battery module, the rental system 100 can easily plan the charging work and the like. Thus, the determining unit 210b may increase the incentive for the user who designates a scheduled return location.

The current location and the travelable distance are used to increase or reduce the incentive in relation to the location of the charging station 500 and the storage battery modules prepared in the charging station 500. For example, in a situation where a storage battery module X is prepared in a charging station S that is relatively close to both the vehicle of (A) and the vehicle of (B), the desires of both (A) and (B) can compete for the storage battery module X. In this case, suppose that a storage battery module Y is prepared in a remote charging station T that cannot be reached from the current location and with the travelable distance of the vehicle of (A), but can be reached from the current location and with the travelable distance of the vehicle of (B). Alternatively, suppose that the a distance to the remote charging station T where the storage battery module Y is prepared can be reached even by the vehicle of (A), but the vehicle of (B) is closer to the charging station T than the vehicle of (A). In such a case, the determining unit 210b reduces the incentive given for the storage battery module X to the vehicle of (B) and greatly increases the incentive given for the storage battery module Y to the vehicle of (B).

By determining the incentive in this way, the vehicle of (B) is guided to select the storage battery module Y so that the vehicle of (A) can select the storage battery module X. That is, the determining unit 210b may determine the incentive in consideration of a distance between the vehicle and the charging station calculated from the vehicle location information and point information of the charging station. Furthermore, the determining unit 210b may determine the incentive in consideration of the travelable distance of the vehicle.

When the consumption history information of the individual information (A) is compared with that of the individual information (B), the maximum output of the individual information (A) is larger than that of the individual information (B). Moreover, the average output of (A) is larger than that of (B). These pieces of information are indicators for determining how much load the user applies to the storage battery module while using it. The larger the load applied while the user is using the storage battery, the larger the maximum output and the average output tend to become. When an excessive load is applied to the storage battery module, the number of times the storage battery module can be used (battery life) is reduced, which is not preferable for the business operator who rents the storage battery modules. To address this issue, the determining unit 210b increases or reduces the incentive to be given in consideration of the maximum output and the average output. Further, regarding the average replacement period, for example, when the storage battery module is used for a period exceeding a period that could cause overdischarge, the determining unit 210b reduces the incentive.

Figure 6:
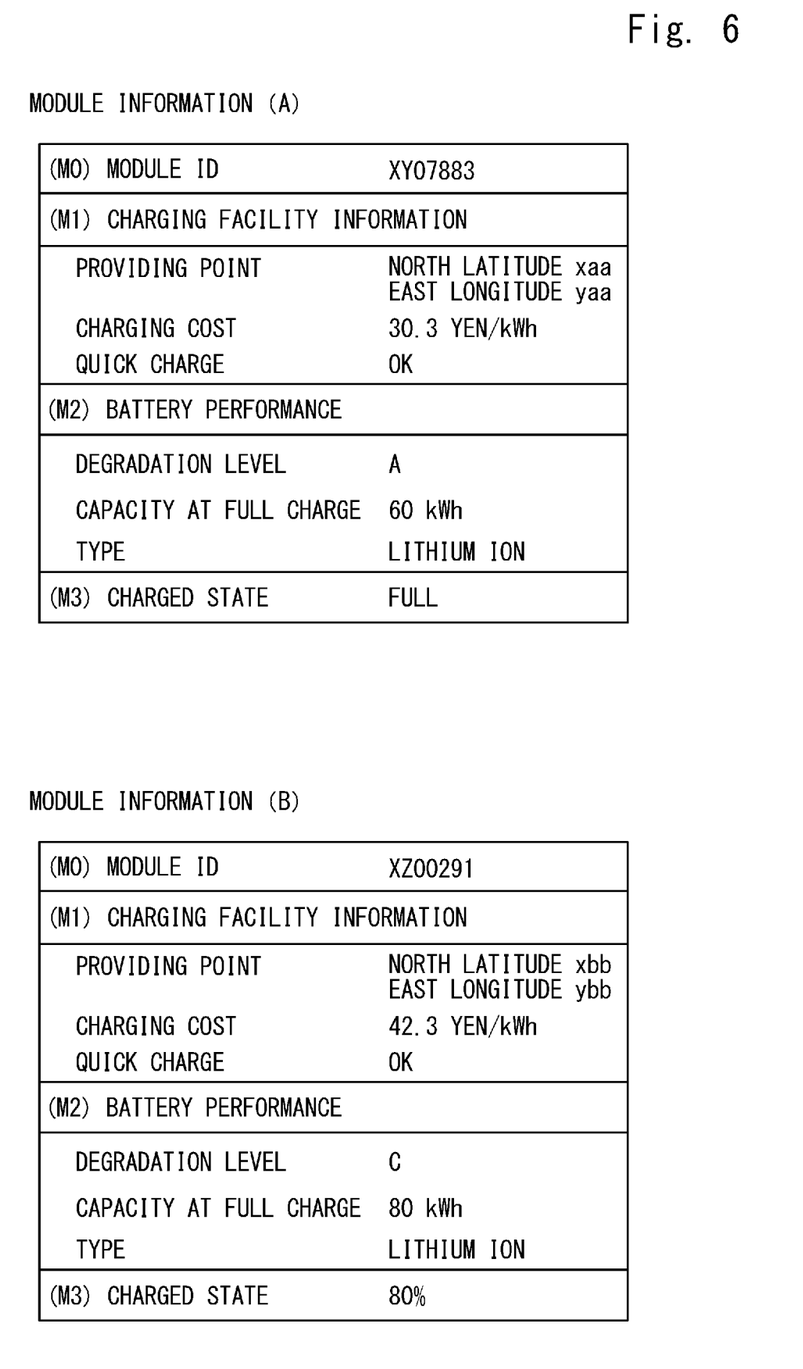
FIG. 6 is an example of module information acquired from the storage battery module by the server.

FIG. 6 shows module information (A) obtained from a first storage battery module and module information (B) acquired from a second storage battery module as examples of the module information acquired by the acquisition unit 210a of the server 200. The control unit 410 of the storage battery module regularly updates the module information, and the acquisition unit 210a of the server 200 acquires the module information from each storage battery module via the Internet network 800 regularly or at the timing of determining the incentives.

Each of the module information (A) and (B) includes a (M0) module ID, (M1) charging facility information, (M2) battery performance, and a (M3) charged state. (M0) The module ID is a number unique to the storage battery module, and is assigned at the time of starting an operation or the like.

(M1) The charging facility information is information related to the charging station to which the storage battery module is connected. The charging facility information describes the providing point, a charging cost, and quick charging. The providing point is a point where the corresponding storage battery module is provided, i.e., the location of the charging station. The control unit 410 of the storage battery module acquires the location information from the charging station via the communication IF 411 when the storage battery module is connected to the charging station. As described above, the providing point is used together with the current location and travelable distance of the (P2) vehicle information.

The charging cost is the cost of charging the electric power of 1 kWh, for example, as shown in the drawing. When the storage battery module with a low charging cost is rented first, it can be expected that another storage battery module can be charged with the charging station at low cost. Thus, it is preferable for the business operator to rent the storage battery modules with low charging costs. For this reason, the determining unit 210b increases the incentive to be given for the storage battery module (A) having a low charging cost so that it will be higher than the incentive to be given for the storage battery module (B).

The quick charge is described as "OK" when the charging station can adjust the charging speed to charge the storage battery module. When the charging station supports only the charging at a normal speed, the quick charge is described as "NO".

(M2) The battery performance is information related to the performance of the storage battery module. The battery performance describes a degradation level, a capacity at full charge, and a type. The degradation level represents how much the storage battery module has degraded compared with the initial performance. The degradation level is represented by, for example, four levels of A to D. As the degradation progresses, an output voltage decreases, and the chargeable electric power decreases. When the degradation level reaches D, the storage battery module is to be discarded. The capacity at full charge is the amount of electric power that can be charged. The determining unit 210b gives a large incentive for renting the storage battery module whose degradation has advanced or for the storage battery module having a small capacity at full charge to promote the use of such storage battery modules. The type indicates a type of the battery. The determining unit 210b reduces the incentive of a high-performance storage battery module having a larger output.

(M3) The charging information indicates a current charging state. When the charging is completed, the charging information indicates "full", while when the storage battery module is being charged, a level of the charge is represented in percentages. Even when the charging information does not indicate "full" at this moment, if the charging is expected to be completed by the rental time desired by the user, the storage battery module can be a rental candidate. In this manner, the charging information is used at the stage when the server 200 extracts the storage battery module rental candidate. When the quick charging is "OK", and the storage battery module can be ready in time for the desired rental time if it is quickly charged, this storage battery module is also considered as a rental candidate. In this case, the determining unit 210b reduces the incentive for renting this storage battery module in consideration of degradation of the storage battery module due to the quick charging.

Figure 7:
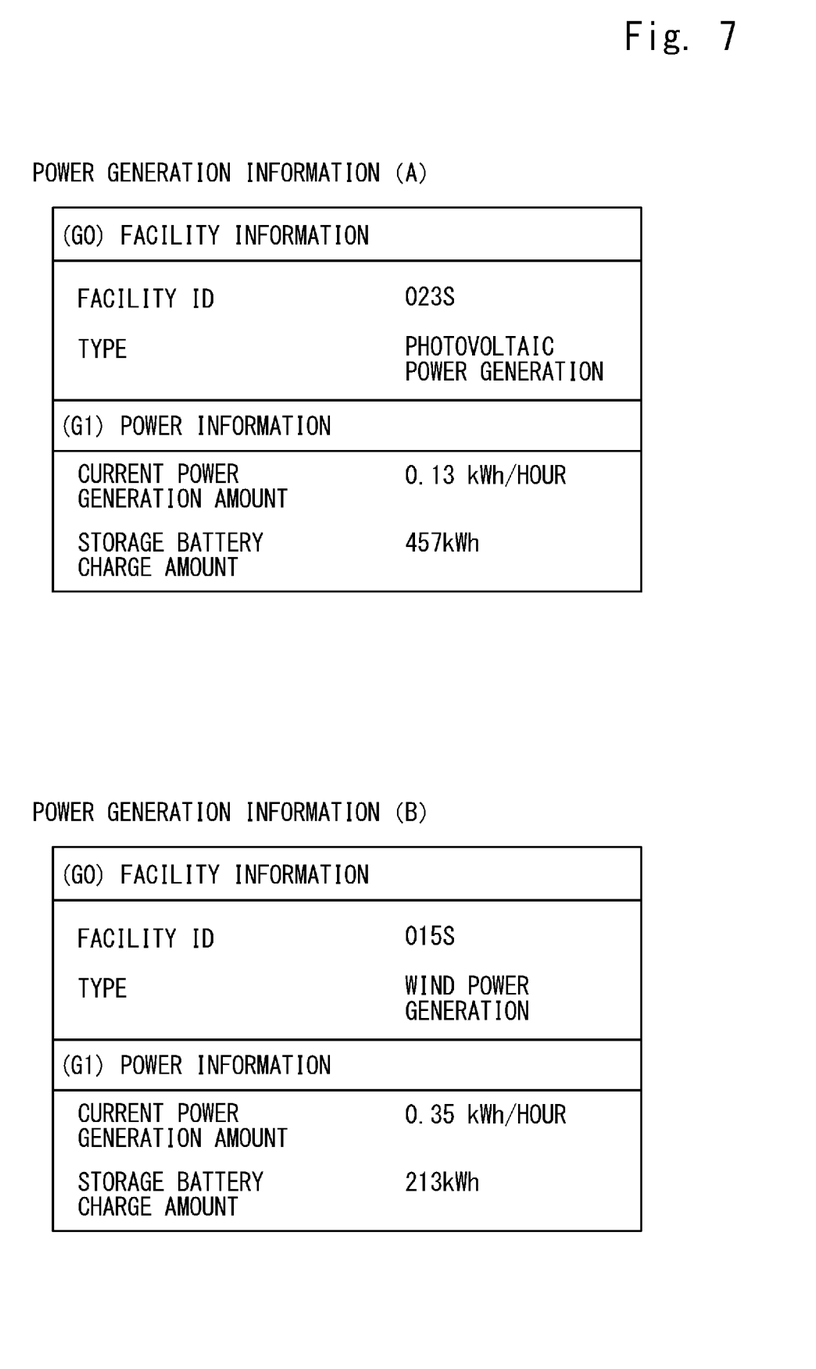
FIG. 7 is an example of power generation information acquired from a power generation facility by the server.

FIG. 7 shows power generation information (A) acquired from a first power generation facility and power generation information (B) acquired from a second power generation facility as examples of the power generation information acquired by the acquisition unit 210a of the server 200. A processing unit of the power generation facility regularly updates the power generation information, and the acquisition unit 210a of the server 200 acquires the power generation information from each power generation facility via the Internet network 800 regularly or at the timing of determining the incentives.

Each of the power generation information (A) and (B) includes (G0) facility information and (G1) power information. Further, the (G0) facility information includes a facility ID and a type. The facility ID is a number unique to the power generation facility and is used for identifying the power generation facility. The type indicates a type of renewable energy the power generation facility generates. When the determining unit 210b estimates the amount of electric power generated by each power generation facility using information of sunshine duration forecast and the wind power forecast, it uses the information about the type.

(G1) The power information includes a current power generation amount and a storage battery charge amount. The current power generation amount indicates an amount of power generated per unit time at the present time. When the storage battery module connected to the charging station receiving the electric power from the power generation facility that currently generates a large amount of electric power is rented first, it can be expected that another storage battery module can be charged quickly with this charging station. Thus, it is preferable for the business operator to rent many storage battery modules connected to the charging station receiving the electric power from the power generation facility that currently generates a large amount of electric power. For this reason, the determining unit 210b increases the incentive to be given for the storage battery module connected to the charging station receiving the electric power from the power generation facility (B) that currently generates a large amount of electric power so that it will become higher than the incentive to be given for the storage battery module connected to the charging station receiving the electric power from the power generation facility (A).

The storage battery charge amount is a charge amount stored in the storage battery 501 included in the charging station connected to the power generation facility. When the storage battery 501 already stores much electric power, more storage battery modules can be charged. In particular, when the current power generation amount is large and the charge amount of the storage battery 501 is also large, it is better to consume the electric power of the storage battery 501 quickly, and to receive the electric power from the power generation facility by the consumed amount. Thus, it is preferable for the business operator to rent many storage battery modules connected to the charging station including a storage battery that already stores a large amount of electric power. For this reason, the determining unit 210b increases the incentive to be given for the storage battery module connected to the charging station that receives the electric power from the power generation facility (A) and that has a large storage battery charge amount so that it will become higher than the incentive to be given for the storage battery module connected to the charging station that receives the electric power from the power generation facility (B).

As described above, the determining unit 210b considers various items, selects items to be considered depending on the situation, and determines the incentive to be given for each of the rentable storage battery modules to each user who desires to rent. Each user recognizes the candidates of rentable storage battery modules and the incentives obtained when renting them, and then the user can select which one of the storage battery modules to rent.

Figure 8:
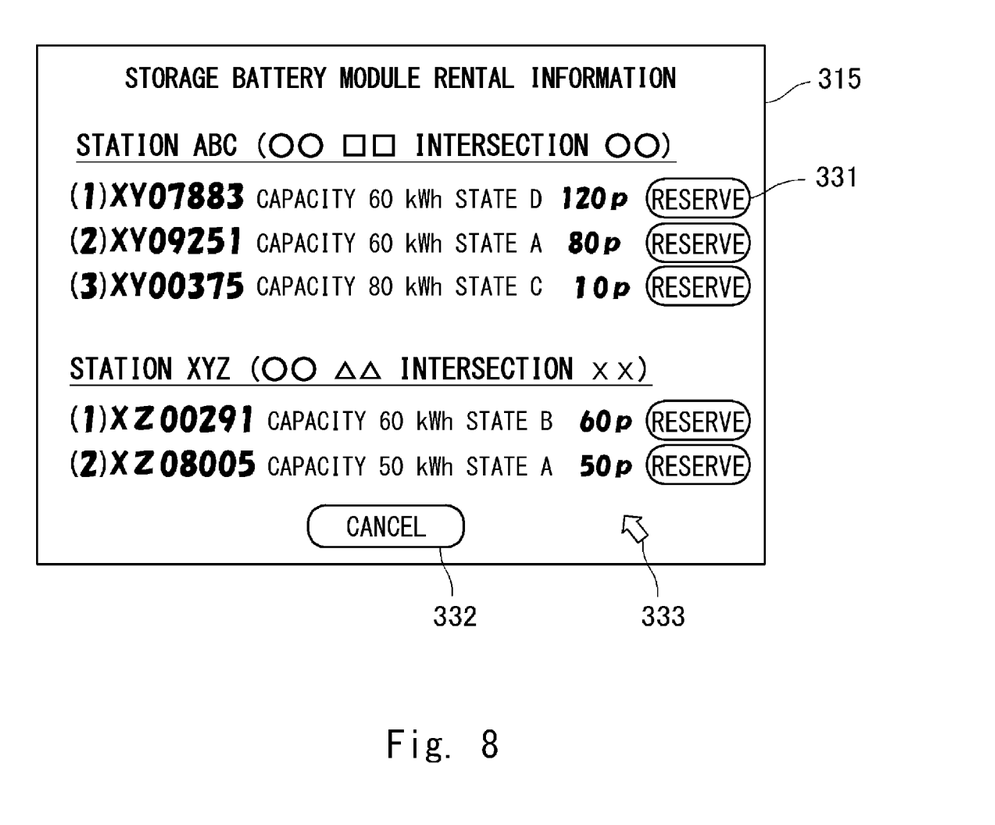
FIG. 8 is an example of a reservation screen displayed on a display unit of the vehicle.

FIG. 8 shows an example of a reservation screen displayed on the display unit 315 of the vehicle 300. When the user inputs a rental request for the storage battery module, the processing unit 310 generates the individual information and transmits it to the server 200. After a while, a proposal shown in FIG. 8 arrives from the server 200. In the proposal shown in FIG. 8, the determining unit 210b determines points for each of the storage battery modules that can be rented to this user using the individual information, the module information, and the power generation information, and the notifying unit 210c transmits the points to the user's vehicle.

The proposal includes a display of the charging station, which is a renting point, and a display of the storage battery modules that can be rented at the charging station. In the example shown in the drawing, the renting points are two places, which are a "station ABC" and a "station XYZ", and the number of rentable storage battery modules are three at the "station ABC" and two at the "station XYZ". For the rentable storage battery module, associated information about the performance and state, and the incentive given when this battery module is selected are displayed. In the example of the drawing, the incentive is displayed as a point, for example, "120 p". A reservation button 331 is provided next to the display of each storage battery module. When the user operates a cursor 333 to select one of the reservation buttons 331, he/she can reserve the storage battery module to rent. When the proposal does not match his/her desire, the user can select a cancel button 332 to cancel the proposal. A result of the selection by the user is transmitted to the server 200.

Figure 9:
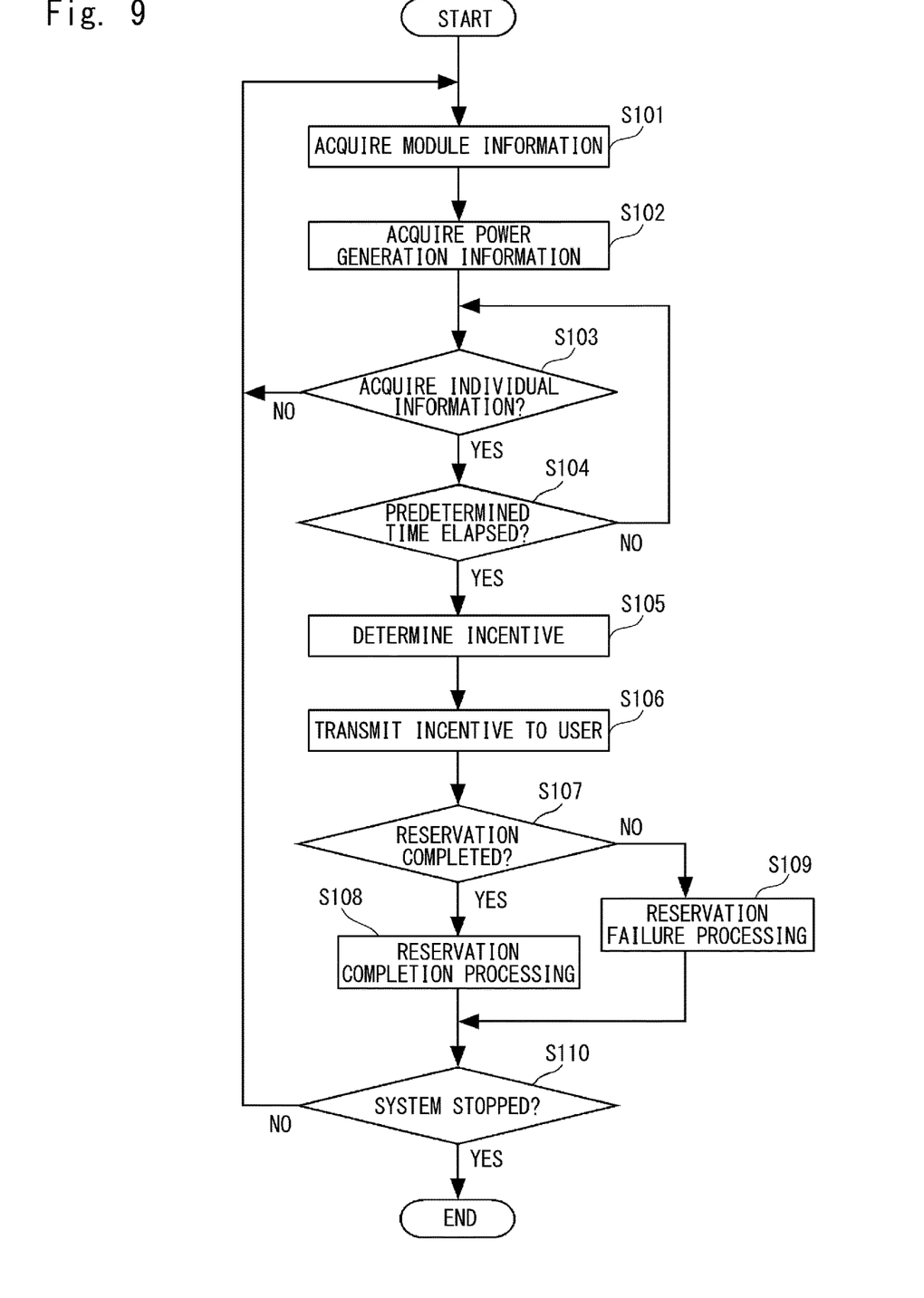
FIG. 9 is a flowchart showing processing executed by the server.

Next, a series of processing flows in this embodiment will be described. FIG. 9 is a flowchart showing processing executed by the server 200. In Step S101, the acquisition unit 210a acquires the module information from each storage battery module 400. In Step S102, the acquisition unit 210a acquires the power generation information from each power generation facility 600.

In Step S103, the acquisition unit 210a confirms whether the individual information has arrived from any one of the vehicles 300. The individual information is also the information that the user 900 desires to rent the storage battery module 400. Thus, the individual information is transmitted to the server 200 at any time. When the acquisition unit 210a has not received the individual information, the process returns to Step S101. That is, the processing from Step S101 to S103 is repeated while the individual information is not acquired. When the acquisition unit 210a has received the individual information, the process proceeds to Step S104.

In Step S104, the acquisition unit 210a confirms whether a predetermined period of time has elapsed since it has received the first individual information. The predetermined period of time is, for example, five minutes. When the predetermined period of time has not elapsed, the process returns to Step S103 to check whether the individual information from another vehicle 300 does not arrive. When the process returns from Step S104 to Step S103, as at least one piece of the individual information has been received, the process proceeds to Step S104 without returning from Step S103 to Step S101. That is, the acquisition unit 210a waits for another rental request from another vehicle 300 for the predetermined period of time after receiving the individual information for the first time.

When the predetermined period of time has elapsed, the process proceeds to Step S105 where the determining unit 210b extracts the candidate of the storage battery module 400 that can be mounted on the vehicle which has transmitted the individual information. Then, as described above, the determining unit 210b determines the incentive for renting each storage battery module 400. In particular, when a plurality of rental requests compete for one storage battery module 400, an adjustment is made by differentiating the incentives so that a specific user 900 can easily select. The notifying unit 210c transmits, as the proposal, a result of such determination of the incentive to each vehicle 300 (Step S106).

In Step S107, the acquisition unit 210a receives a reservation result from the vehicle 300. When the reservation of any of the storage battery modules 400 is completed in the reservation result, the process proceeds to Step S108. When the reservation is not completed, the process proceeds to Step S109. In Step S108, the processing unit 210 executes reservation completion processing. Specifically, for example, the reserved storage battery module 400 is excluded from future renting candidates. Further, the giving unit 210d gives the presented incentive to the user 900 who made the reservation. The giving unit 210d corrects the contents of the remuneration DB 213b accordingly. When the process proceeds to Step S109, the processing unit 210 executes reservation failure processing. Specifically, for example, the processing unit 210 adjusts a coefficient and the like so as to increase the incentive for a presented condition.

When the processing of Steps S108 and S109 is completed, the process proceeds to Step S110 where the processing unit 210 evaluates whether the system has been stopped. When the system has not been stopped, the process returns to Step S101, whereas when the system has been stopped, termination processing is executed and the series of processes is terminated.

According to the above-described embodiment, in a business of renting storage battery modules in a rental style, even when the business operator dispersedly distributes the providing points (the charging stations 500), the business operator may not prepare a large number of storage battery modules in each providing point. That is, it is possible to optimally allocate a small number of storage battery modules by balancing the circumstances of the renters and rentees. A user who desires to rent may select, for example, one with a low incentive if an urgent replacement is required or accept some inconvenience if the user focuses on the incentive. The business operator, who is a renter, can adjust which storage battery module to preferentially rent according to the power generation state, charging state, and the like. Thus, it is possible to reduce the charging cost and achieve a long-term operation of the storage battery module in addition to the optimum allocation of the storage battery modules. This eventually contributes to promoting the use of the renewable energy.

In the above embodiment, some evaluation factors for determining the incentive have been described. However, the evaluation factors are not limited to the above examples. Further, it is not necessary to employ all the above-described evaluation factors, and instead a combination of the evaluation factors to be employed may be changed according to the condition. For example, the determining unit 210b may determine the incentive based on the individual information and the module information without using the power generation information. In the individual information, there may be the evaluation factor that is used, for example, only when a plurality of rental requests competes for one storage battery module in the evaluation factors described.

In this embodiment, an example in which one server controls the entire system has been described. However, for example, the determining unit 210*b* and the giving unit 210*d* may be composed of different servers. For example, the incentives are provided by a sponsor such as a company or a country. An operator who manages the incentives may manage the server of the giving unit 210*d* and the remuneration DB 213*b*. In this embodiment, the remuneration such as points, coupons, and discounts that can be exchanged for goods and services are described as the incentives. However, the remuneration is not limited to them and instead may be any form as long as it motivates the user to act.

Further, in this embodiment, the storage battery module rental system has been described using an example of the replaceable storage battery module 400 for the vehicle 300. However, the device to which the storage battery module is used is not limited to the storage battery module mounted on the vehicle and instead may be any storage battery module of the rental style. For example, this system can also be applied to a situation where a remotely operated drone replaces a storage battery module at any relay point. In this case, evaluation of rental requests can be performed by the user operating at a remote place. Alternatively, such evaluation may be performed by a control program of a drone that the user has incorporated in advance. In this case, the control program executes the behavior as the user.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A storage battery module rental system comprising:
   a storage battery module prepared in each providing point that is dispersedly distributed and that can be rented to a user;
   an acquisition unit configured to acquire individual information of a plurality of the users and module information from the storage battery module, the user being a rentee candidate of the storage battery module;
   a determining unit configured to determine an incentive given for renting the storage battery module based on the individual information and the module information in such a way that the incentive could differ for each user; and
   a notifying unit configured to notify the user of the incentive determined by the determining unit for each of the users;
   a power generation facility that is established so as to correspond to the providing point and that generates electric power as renewable energy for charging the storage battery module, wherein the acquisition unit acquires power generation information related to an amount of power generated by the power generation facility, and
   the determining unit determines the incentive given for renting the storage battery module based on the individual information, the module information, and the power generation information in such a way that the incentive could differ for each of the users.

2. The storage battery module rental system according to claim 1, wherein when the determining unit determines the incentive for renting one of the storage battery modules to the plurality of users, the determining unit compares the individual information of the users with each other to determine the incentive.

3. The storage battery module rental system according to claim 1, further comprising a charging facility that is established at the providing point and that can adjust a charging speed to charge the storage battery module, wherein
   the individual information includes information related to a rental time of the storage battery module that the user desires to rent, and
   the determining unit determines the incentive in consideration of whether the charging facility needs to adjust the charging speed according to the rental time.

4. The storage battery module rental system according to claim 1, wherein
   the individual information includes at least one of a return time and a return point at which the user desires to return the rented storage battery module, and
   the determining unit determines the incentive in consideration of the return time and the return point.

5. The storage battery module rental system according to claim 1, wherein
   the module information includes cost information about a cost for charging the storage battery module, and
   the determining unit determines the incentive in consideration of the cost information.

6. The storage battery module rental system according to claim 1, wherein
   the module information includes degradation information representing a level of degradation of the storage battery module, and
   the determining unit determines the incentive in consideration of the degradation information.

7. The storage battery module according to claim 1, wherein
   the storage battery module is detachably mounted on an electric vehicle as an energy source for traveling of the electric vehicle,
   the individual information includes vehicle information of the electric vehicle, and
   the determining unit determines the incentive in consideration of the vehicle information.

8. The storage battery module rental system according to claim 7, wherein
   the vehicle information includes vehicle location information of the electric vehicle,
   the module information includes providing point information of the providing point at which the storage battery module is prepared, and the determining unit determines the incentive in consideration of a distance between the electric vehicle and the providing point calculated from the vehicle location information and the providing point information.

9. The storage battery module system according to claim 8, wherein
the vehicle information includes distance information indicating a distance that can be traveled by the electric vehicle with the storage battery module mounted on the electric vehicle, and
the determining unit determines the incentive in consideration of the distance between the electric vehicle and the providing point and the distance that can be traveled by the electric vehicle.

10. The storage battery module rental system according to claim 7, wherein
the vehicle information includes history information related to consumption of the storage battery module mounted on the electric vehicle in the past, and
the determining unit determines the incentive in consideration of the history information.

11. A storage battery module rental method comprising:
acquiring module information from a storage battery module prepared in each providing point that is dispersedly distributed and that can be rented to a user;
acquiring individual information of a plurality of the users, the user being a rentee candidate of the storage battery module;
determining an incentive given for renting the storage battery module based on the individual information and the module information in such a way that the incentive could differ for each user; and
notifying the user of the incentive determined by the determining unit for each of the users;
a power generation facility that is established so as to correspond to the providing point and that generates electric power as renewable energy for charging the storage battery module, wherein the acquisition unit acquires power generation information related to an amount of power generated by the power generation facility, and
the determining unit determines the incentive given for renting the storage battery module based on the individual information, the module information, and the power generation information in such a way that the incentive could differ for each of the users.

12. A non-transitory computer readable medium storing a storage battery module rental program causing a computer to execute:
acquiring module information from a storage battery module prepared in each providing point that is dispersedly distributed and that can be rented to a user;
acquiring individual information of a plurality of the users, the user being a rentee candidate of the storage battery module;
determining an incentive given for renting the storage battery module based on the individual information and the module information in such a way that the incentive could differ for each user; and
notifying the user of the incentive determined by the determining unit for each of the users;
a power generation facility that is established so as to correspond to the providing point and that generates electric power as renewable energy for charging the storage battery module, wherein the acquisition unit acquires power generation information related to an amount of power generated by the power generation facility, and
the determining unit determines the incentive given for renting the storage battery module based on the individual information, the module information, and the power generation information in such a way that the incentive could differ for each of the users.

* * * * *